(12) United States Patent
Bateman

(10) Patent No.: US 7,175,440 B1
(45) Date of Patent: Feb. 13, 2007

(54) EZEE BOY EQUINE THERAPEUTIC AND INSTRUCTIONAL RIDING AID

(76) Inventor: Linda C. Bateman, 18151 30th Ave., Chippewa Falls, WI (US) 54729

( * ) Notice: Subject to any disclaimer, the term of this patent is extended or adjusted under 35 U.S.C. 154(b) by 58 days.

(21) Appl. No.: 11/121,457

(22) Filed: May 4, 2005

Related U.S. Application Data

(60) Provisional application No. 60/572,327, filed on May 19, 2004.

(51) Int. Cl.
   *A63B 69/04* (2006.01)
(52) U.S. Cl. ..................................... 434/247
(58) Field of Classification Search ............... 434/247, 434/255, 258, 260; 472/95, 97, 99; 446/26, 446/376, 377
   See application file for complete search history.

(56) References Cited

U.S. PATENT DOCUMENTS

| | | | |
|---|---|---|---|
| 491,927 A | | 2/1893 | Rygg |
| 2,195,824 A | | 4/1940 | Ochoa |
| 2,253,096 A | * | 8/1941 | Sheldon .................... 280/1.195 |
| 2,421,091 A | * | 5/1947 | Sylvester ................. 280/1.182 |
| 2,593,991 A | * | 4/1952 | Crosby ........................ 446/293 |
| 2,982,559 A | * | 5/1961 | Hawkins .................. 280/1.182 |
| 3,672,075 A | | 6/1972 | Eikelenboom |
| 4,063,607 A | * | 12/1977 | Patrick ........................ 180/6.5 |
| 4,713,010 A | | 12/1987 | Veillas |
| 4,957,444 A | | 9/1990 | Armen |
| 4,988,300 A | | 1/1991 | Yamaguchi et al. |
| 5,429,515 A | | 7/1995 | Greenwood |
| 6,059,666 A | | 5/2000 | Ohara et al. |
| 6,093,025 A | | 7/2000 | Willcox |
| 6,210,167 B1 | | 4/2001 | Nishiyama |
| 6,210,286 B1 | | 4/2001 | Ohara et al. |
| 6,264,569 B1 | | 7/2001 | Cannavino |
| 6,599,198 B2 | | 7/2003 | Ettenhofer |
| 6,616,456 B1 | | 9/2003 | Nalty et al. |
| 6,808,458 B1 | * | 10/2004 | Jung ........................... 472/97 |
| 6,866,594 B2 | * | 3/2005 | Greenwood ................. 473/422 |

* cited by examiner

*Primary Examiner*—Kurt Fernstrom
(74) *Attorney, Agent, or Firm*—Tipton L. Randall

(57) ABSTRACT

A life sized model horse assembly includes a body section with a moveable neck section and a moveable head section. The legs of the body section are mounted to a base member for maintaining the model horse assembly in an upright orientation. The model horse assembly is fitted with a conventional saddle so the rider can practice mounting and dismounting from the full sized model horse assembly without the horse moving. The realistically featured neck section and head section are hinged so that the neck section can move up and down, relative to the body section. Likewise, the head section is hinged to the neck section so the head section can move side to side, relative to the neck section and body section. There are flexible coverings at the junction between the body section and the neck section and the neck section and the head section to cover and protect the hinge mechanisms. A counterweight mechanism, interior the artificial horse counter balances the head and neck sections, allowing the rider to move the head section and neck section side to side and up and down by applying suitable pressure via the reins and bridle.

20 Claims, 7 Drawing Sheets

EZEE BOY EQUINE THERAPEUTIC AND INSTRUCTIONAL RIDING AID

CROSS-REFERENCE TO RELATED APPLICATIONS, IF ANY

This application claims the benefit under 35 U.S.C. §119 (e) of co-pending provisional application Ser. No. 60/572,327, filed 19 May, 2004. Application Ser. No. 60/572,327 is hereby incorporated by reference.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates to an artificial horse and, more particularly, a life sized model horse used as an instructional aid in teaching the fundamentals of riding horses, as well as an equine therapeutic device.

2. Background Information

Horse riding was once the main mode of transportation for man. As various mechanical means of transportation developed, horse riding became less common. Recently, horse riding has again gained popularity for both adults and children. The beginning rider often is intimidated by the size of the horse and the height at which the rider sits upon the horse's back. In addition, the process of riding a horse has been found beneficial to individuals with physical and/or mental impairments.

Some examples of devices for teaching horse riding with a simulated horse for which patents have been granted include the following.

Rygg, in U.S. Pat. No. 491,927, describes a mechanical horse with an internal crank mechanism that propels the lever driven legs to impart a walking motion to the mechanical horse.

In U.S. Pat. No. 2,195,824, Ochoa discloses a toy horse device that moves on wheels attached to the four legs. The legs pivot as the user moves up and down while seated on the saddle to propel the toy forward. The head pivots up and down and side to side to some extent.

Eikelenboom, in U.S. Pat. No. 3,672,075, describes an apparatus for training and exercise with respect to the mechanical athletic side of horsemanship, except for displacement and speed. The apparatus includes a coordinated structure simulating the trunk, neck and head of a horse and a cooperating mechanism providing the motions involved in horsemanship and horseback riding. The trunk includes chest widening and saddle mechanisms and carries a stirrup mechanism. The neck mechanism is pivoted between the trunk and head, and the head carries a bit mechanism and reins for actuating the head and neck by the rider.

In U.S. Pat. No. 4,713,010, Veillas discloses an apparatus for simulating the different paces of a horse and the aids to be applied for controlling the horse. The apparatus includes four representative display lamps that light-up in order to represent the precise time-duration of the instant of ground contact of the different hooves of a horse. The lamps are supplied by four separate circuits in dependence on control devices for ensuring different lighting-up recurrence rates and sequences with a view to reproducing different types of paces of a horse. In addition, a signal lamp is intended to light-up so as to represent predetermined aids for controlling a horse, this lamp being connected into a circuit which includes an operating key at the user's disposal. Closing of the circuit at a predetermined instant has the effect of turning on the lamp and blocking the circuits of the representative display lamps in their state of operation at that instant.

Arman, in U.S. Pat. No. 4,957,444, describes a training horse simulator for teaching persons such as handicapped children. The simulator includes a saddle, a pivoting head assembly, reins, a bit simulator, and pressure-sensitive switches. Indicators inform the person when stops and turns have been properly executed and when pressure is applied to the simulator, as in posting.

In U.S. Pat. No. 4,988,300, Yamaguchi et al. disclose a riding simulator where the basic stepping actions of a real horse are closely simulated. The riding simulator includes an artificial horse body, with horse body supporting structures for circularly, movably supporting the lower ends of forelegs and hind legs of the horse body. Swing adjusting devices drive the horse body supporting structures and move the horse body in both vertical and longitudinal directions, and phase adjusting devices adjust the phase difference between the vertical motion and the longitudinal motion of the horse body when the horse body supporting structures are driven. The riding simulator also includes provision for enabling the rider to give aids to the horse body, so that the basic stepping actions of a real horse can be simulated.

Greenwood, in U.S. Pat. No. 5,429,515, describes an apparatus that helps riders to train for horse riding. The apparatus comprises a body portion and a neck portion. The neck portion is pivotally mounted to the body portion. The apparatus gives accurate simulation of the movements of a horse. It may have a powered means for moving the body portion with respect to the base, and the neck portions may be pivotally mounted about two curved pivotal axes. A head may be pivotally mounted to the neck about a horizontal axis, and link means may extend between the head and body to cause the head to pivot in the opposite direction to the body.

In U.S. Pat. No. 6,059,666, Ohara et al. disclose a riding game system that provides a feeling as if a player is riding on a real animal. The riding game system includes a mimetic animal device and a display showing a virtual space. The mimetic animal device is in the form of a horse having a head and a body. The player controls the mimetic animal device like controlling an animal in the virtual space by riding on the body, gripping a rein portion provided on the head and placing the player's foot on a pair of steps provided at the body. The head is inclined up and down and rotated from side to side. The body is rocked back and forth while the steps are also rocked back and forth. The rotational movement of the head from side to side and the rocking movement of the body backward and forward are detected for controlling the virtual horse in the virtual space.

Wilcox, in U.S. Pat. No. 6,093,025, describes an apparatus and method of using the apparatus for teaching horseback riding skills without the use of a horse. The apparatus is secured to the student so that the student may move about. The student uses reins to manipulate a bit. A pendulum suspended from a spring simulates the motion of a horse's mouth. A feedback mechanism compares the tension exerted by the student on the reins to the simulated motion of the horse's mouth, assisting the student in learning how to follow the bit and other riding skills.

In U.S. Pat. No. 6,210,167, Nishiyama discloses a riding gaming machine with display means for displaying game information and a riding horse body imitating a real horse body. The riding horse body is provided with manipulation means for performing game manipulation. A control section is connected to the display means and the manipulation means for controlling game information displayed on the display means.

Ohara et al., in U.S. Pat. No. 6,210,286, describe a riding, game system that provides a feeling as if a player is riding on a real animal. The riding game system includes a mimetic animal device and a display showing a virtual space. The mimetic animal device is in the form of a horse having a head and a body. The player controls the mimetic animal device like controlling an animal in the virtual space by riding on the body, gripping a rein portion provided on the head and placing the player's foot on a pair of steps provided at the body. The head is inclined up and down and rotated from side to side. The body is rocked back and forth while the steps are also rocked back and forth. The rotational movement of the head from side to side and the rocking movement of the body backward and forward are detected as information for controlling the virtual horse in the virtual space.

In U.S. Pat. No. 6,264,569, Cannavino discloses a hobby horse device in which the diagonal movement and the vertical movement produced in the back of a horse as he trots and canters is simulated so that a rider can exercise and practice performing riding skills. The hobby horse includes a plurality of seat supports with handles. Straps are attached to the base of the seat supports which encompass a support dowel that lays adjacent to the seat supports. The support dowel is attached on both sides to a basic frame by a plurality of springs. The basic frame contains a form representing the horse's girth and stirrups for the rider's feet. The extension of the springs and their subsequent return to their original shape provide the vertical movement as the rider presses down and rises with his/her seat. The diagonal movement is produced beneath the rider's seat when the rider raises and lowers each seat support independently of the other. The seat supports also allow for turning, half-halting and halting in response to the rider's body position and use of aids.

Ettenhofer, in U.S. Pat. No. 6,599,198, describes an apparatus to qualify individuals for equine-assisted physical therapy that is controlled entirely by a trainer or therapist, thereby regimenting the process for consistent and transferable results. The preferred embodiment includes a rigid frame with a plurality of upright, spaced-apart vertical members and a rideable body within the frame, preferably suspended from the vertical uprights using multiple springs. At least one handle, rigidly affixed to the rideable body, enables the trainer or therapist to direct the motion of the body with a rider thereon, to determine how the individual will adapt to riding on a living horse or to train the client with no actual riding experience. The rideable body is horseback shaped, enabling a saddle to be received thereon. The outer surface of the rideable body is also substantially smooth, however, enabling the individual to mount the body in bareback-style, if so desired. The apparatus preferably further includes a structure connecting the vertical members relative to their lower ends, such that the spaces between the vertical members remains open to the ground, enabling the trainer/therapist to stand close to or away from the rider without physical impediment. Attachment points are preferably provided, enabling a plurality of springs or other elastic members to be attached from each vertical member to the body, thereby facilitating adjustment for different riders of varying weight.

In U.S. Pat. No. 6,616,456, Nalty et al. disclose a therapeutic riding device which treats physical and mental impairments of riders by simulating the motion of a horse in three dimensions. A patient sits on a seat (12), which is mechanically driven by a motor (13), the seat including an arrangement of members having cams (33a, 33b). The three-dimensional pattern made by the seat may be controlled so as to mimic an ideal hippotherapy horse.

Applicant has devised a life sized, model horse assembly suitable for use as an instructional aid in teaching the fundamentals of riding horses. The life sized, model horse assembly is also suitable for use as an equine therapeutic device, particularly well suited for individuals with physical and/or mental impairments. The life sized, model horse assembly invention is described in greater detail below.

SUMMARY OF THE INVENTION

The invention is directed to a life sized, model horse assembly with moveable head and neck sections. The model horse assembly includes a hollow body section with four upstanding leg portions attached thereto and a neck opening with internal brace member there across. There is a hollow neck section with first and second open ends and internal brace members adjacent each open end thereof. There is a hollow head section with a nose end and an open neck end having internal brace member adjacent thereto. A first hinge mechanism is secured between the internal brace member of the body section's neck opening and the internal brace member adjacent the neck section's first open end. The first hinge mechanism connects the neck section to the body section, and provides vertical movement of the neck section relative to the body section. A second hinge mechanism is secured between the internal brace member of the head section's open neck end and the internal brace member adjacent the neck section's second open end. The second hinge mechanism connects the head section to the neck section, and provides horizontal movement of the head section relative to the neck section. A linear counterweight mechanism is secured at one end, interior the hollow neck section, and extends through the first open end of the hollow neck section and into the hollow body section through the neck opening therein. The counterweight mechanism counter balances the neck section and attached head section, thereby maintaining the head section and neck section in a natural orientation relative to the body section of the model horse assembly.

There are flexible coverings at the junction between the body section and the neck section and the neck section and the head section to protect the hinge mechanisms. The leg portions of the model horse assembly are mounted to a planar platform member for maintaining the model horse assembly in an upright orientation. Linear stabilizer members are secured at opposite ends of the planar platform member for maintaining the planar platform member and attached model horse assembly in a constant orientation on a support surface The model horse assembly is fitted with a conventional saddle, so the rider can practice mounting and dismounting from the full sized, model horse assembly, without the concern that a real horse might move during such practice.

The head section is fitted with a bridle and reins that the rider can grasp. The counterweight mechanism allows the rider to move the head section and neck section side to side and up and down by applying suitable pressure via the reins and bridle. Thus, a beginning rider can become accustomed to sitting atop a full sized horse, as well as practicing the proper technique for controlling the horse, via pressure on the reins and bridle.

DESCRIPTION OF THE EMBODIMENTS

Figure 1:
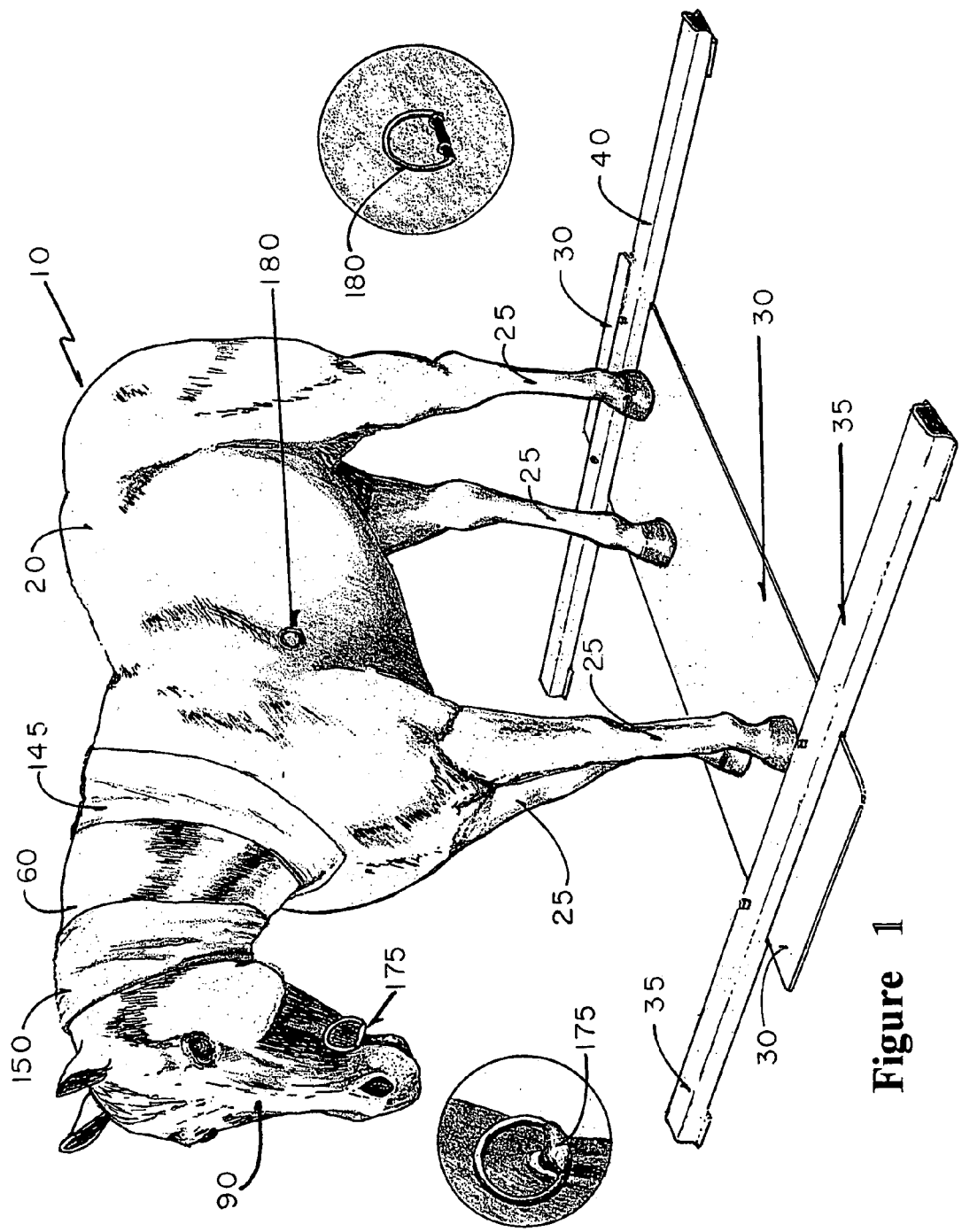
FIG. 1 is a perspective view of the life sized, model horse assembly of the present invention.
Figure 2:
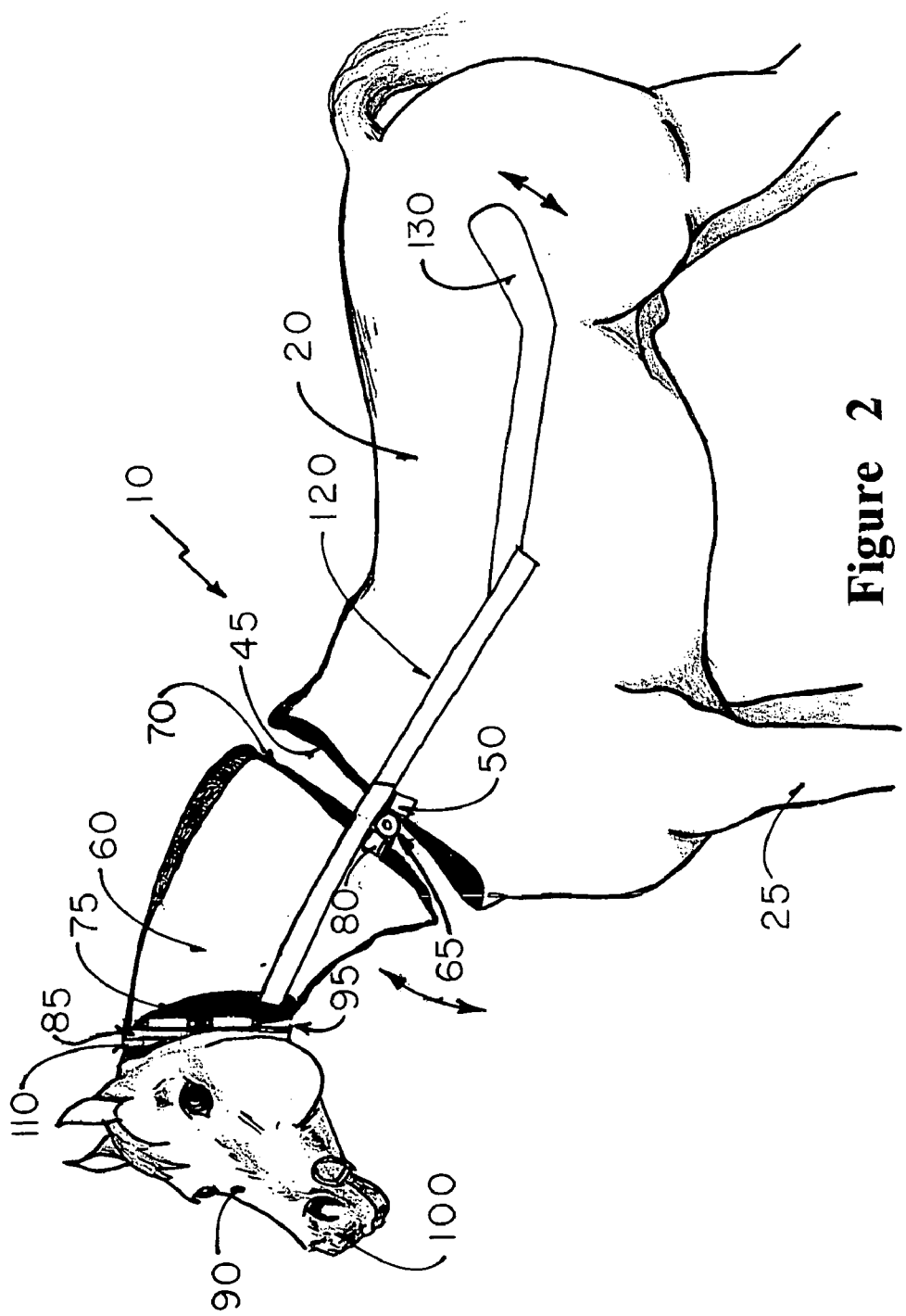
FIG. 2 is a perspective side view of the life sized, model horse assembly of the present invention with hinge mechanisms and counter weight mechanism shown.
Figure 3:
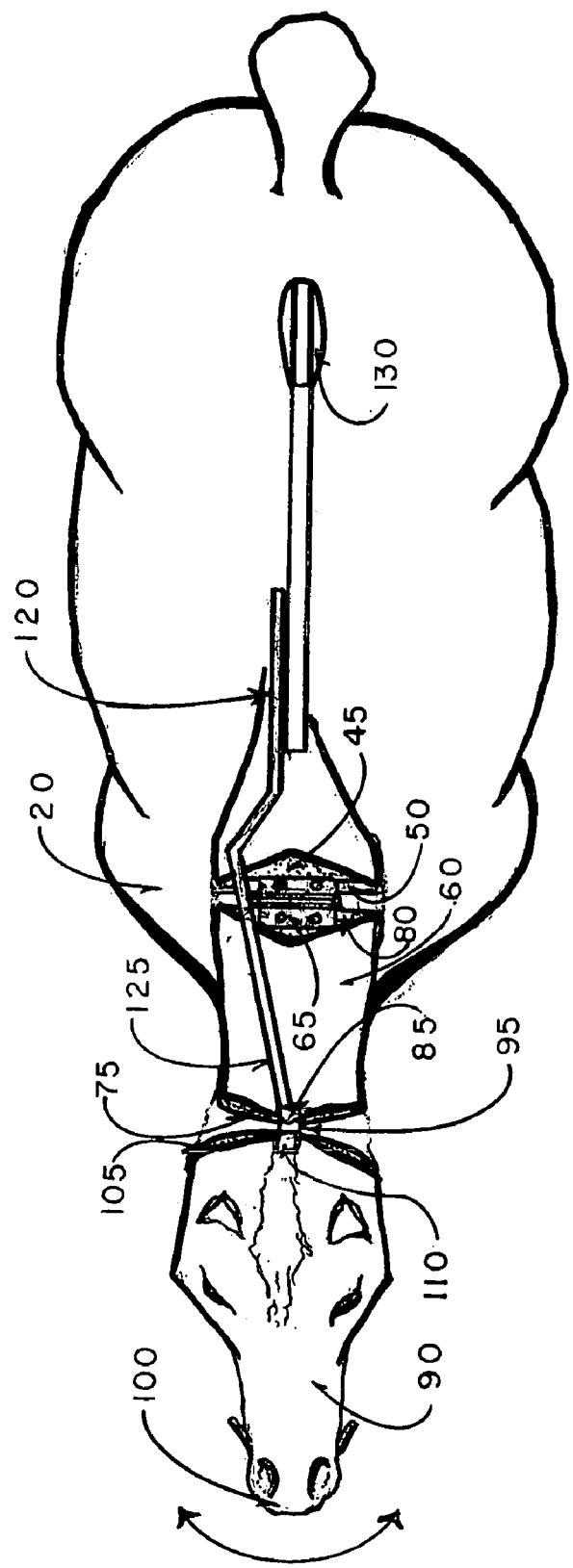
FIG. 3 is a top view of the life sized, model horse assembly of the present invention with hinge mechanisms and counter weight mechanism shown.

Nomenclature
  10 Life Sized, Model Horse Assembly
  20 Hollow Body Section
  25 Leg Portions
  30 Platform Member
  35 Front Linear Stabilizer
  40 Rear Linear Stabilizer
  45 Neck Opening of Body Section
  50 Internal Brace Member
  60 Hollow Neck Section
  65 First Hinge Mechanism
  70 First Open End of Neck Section
  75 Second Open End of Neck Section
  80 Internal Brace Member
  85 Internal Brace Member
  90 Hollow Head Section
  95 Second Hinge Mechanism
  100 Nose End of Head Section
  105 Open Neck End of Head Section
  110 Internal Brace Member of Head Section
  120 Counter Weight Mechanism
  125 Secured End of Counter Weight Mechanism
  130 Heavier End of Counter Weight Mechanism
  140 Double Acting Spring Hinge Member
  145 First Flexible Covering Member
  150 Second Flexible Covering Member
  175 D-Ring Snaffle Bit
  180 D-Rings to Secure Saddle Construction Referring to the FIGS. 1–3, the life sized, model horse assembly 10 is shown The life sized, model horse assembly 10 comprises a generally hollow body section 20 having four leg portions 25 attached thereto, with each leg section 25 attached to a planar platform member 30 at an end opposite the body section 20. The planar platform member 30 includes front and rear linear stabilizers 35, 40 adapted for maintaining the planar platform member 30 in a constant orientation on a support surface S. The hollow body section 20 has a neck opening 45 with an internal brace member 50 there across.

A hollow neck section 60 is hingedly secured to the body section 20 by a first hinge mechanism 65. The hollow neck section 60 has a first open end 70 and a second open end 75 and includes internal brace members 80, 85 adjacent each open end 70, 75 thereof. The first hinge mechanism 65 is attached to the internal brace member 50 of the body section's neck opening 45, and to the internal brace member 80 adjacent the first open end 70 of the neck section 60. The first hinge mechanism 65 provides vertical movement of the neck section 60 relative to the body section 20.

A hollow head section 90 is hingedly secured to the neck section 60 by a second hinge mechanism 95. The hollow head section 90 has a nose end 100 and an open neck end 105 having an internal brace member 110 adjacent thereto. The second hinge mechanism 95 is attached to the internal brace member 110 of the head section's neck opening 105, and to the internal brace member 85 adjacent the second open end 75 of the neck section 60. The second hinge mechanism 95 provides horizontal movement of the head section 90 relative to the neck section 60.

A counter weight mechanism 120 is secured at one end 125 to the interior of the hollow neck section 60 and extends through the first open end 70 of the hollow neck section 60 and into the hollow body section 20 through the neck opening 45 therein. The counter weight mechanism 120 maintains the head and neck sections 90, 60 in a natural orientation relative to the body section 20 of the model horse assembly 10. The counter weight mechanism 120 allows side to side and up and down movement of the head section 90 and the neck section 60, relative to the body section 20, upon applying pressure to the head section 90, via a bridle (not shown) and reins (not shown) attached thereto.

The counter weight mechanism 120 is best seen in FIGS. 2 and 3, where it is secured at one end 125 to the interior of the hollow neck section 60 and extends through the first open end 70 of the hollow neck section 60 and into the hollow body section 20 through the neck opening 45 therein. The linear, counter weigh mechanism 120 is offset to one side of the neck section 60 and the body section 20 and contacts the internal brace member 50 positioned horizontally across the neck opening 45 of the body section 20. The brace member 50 acts as a fulcrum, with the heavier end 130 of the counter weight mechanism 120 counter balancing the neck section 60 and attached head section 90.

Figure 4:
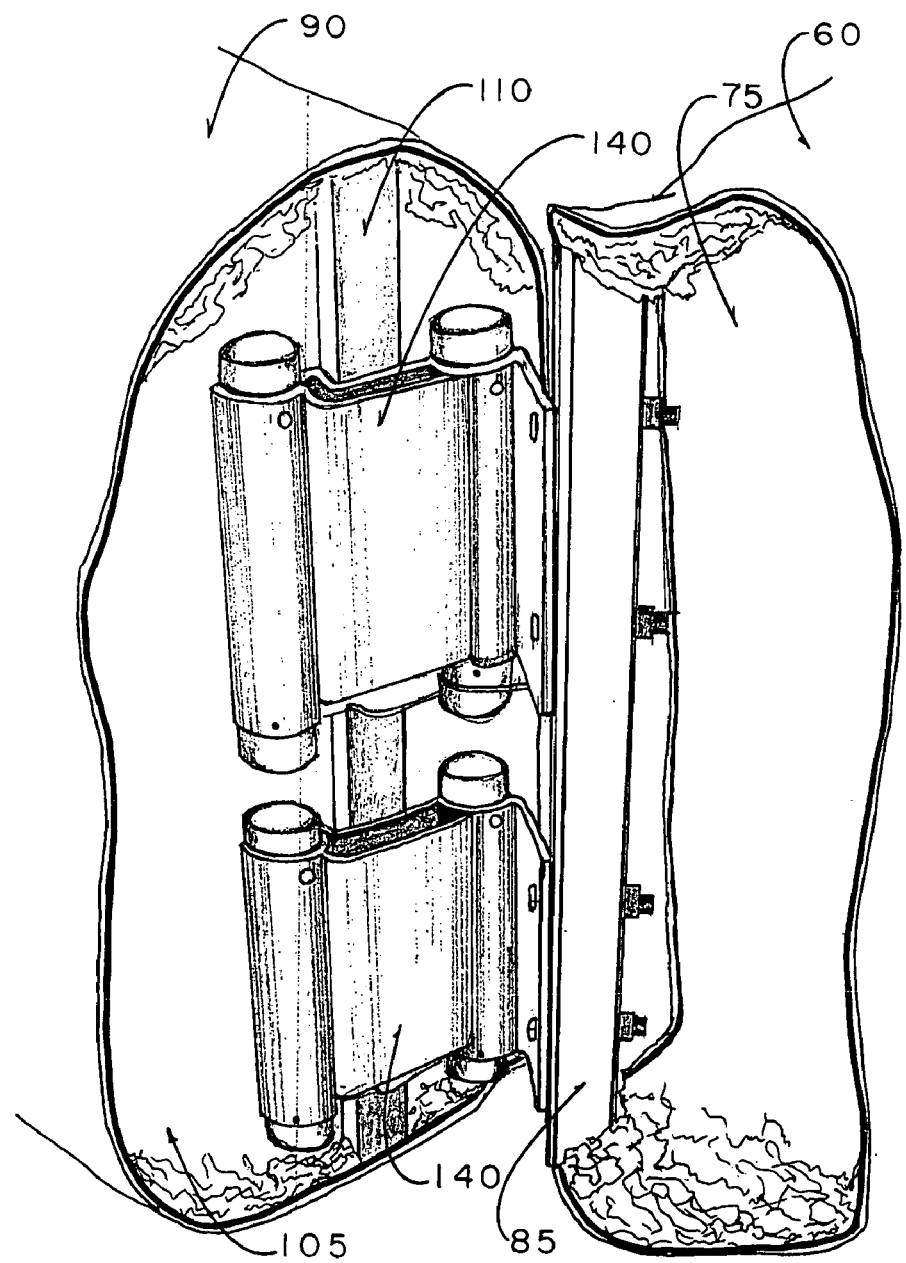
FIG. 4 is a perspective view of the second hinge mechanism used within the life sized, model horse assembly of the present invention.
Figure 5:
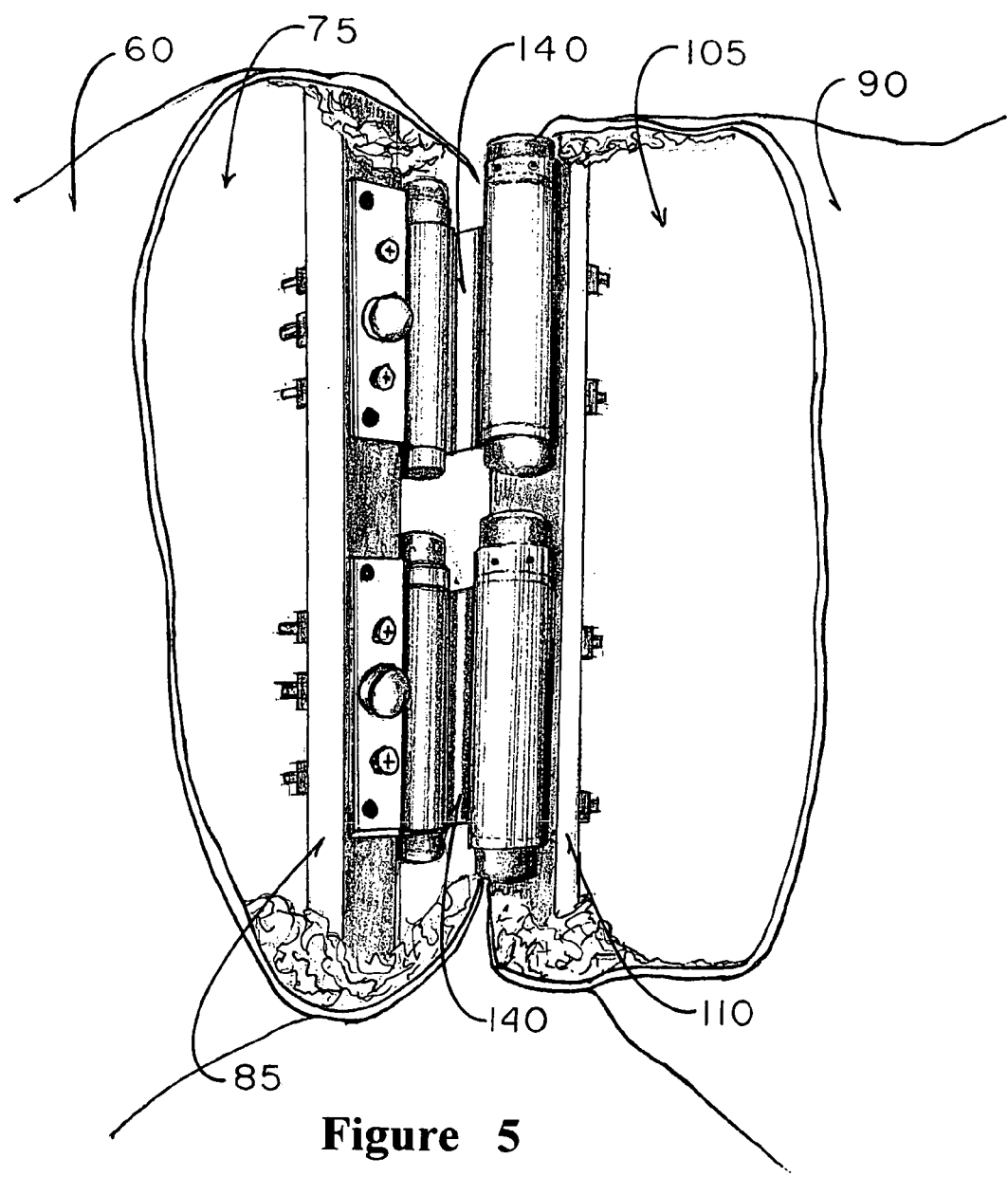
FIG. 5 is another perspective view of the second hinge mechanism used within the life sized, model horse assembly of the present invention.

Referring now to FIGS. 4–5, the second hinge mechanism 95, used to allow movement of the hollow head section 60 relative to the neck section 50, is shown in greater detail. The embodiment of the second hinge mechanism 95 of FIGS. 4–5 includes a pair of double acting spring hinge members 140, used to provide side to side movement of the head section 90. The double acting spring hinge members 140 are available commercially from a variety of sources. One commercial source for the particular hinge member 140 shown is Bommer Industries, Inc., of Landrum, S.C. Each double acting spring hinge member 140 is secured to both the vertically oriented, internal brace member 110 of the head section 90 and to the vertically oriented, internal brace member 85 of the neck section 60, adjacent the head section

90, as illustrated. FIG. 4 shows the head section 90 pivoting in one horizontal direction relative to the neck section 60, while FIG. 5 shows head section 90 pivoting in the other horizontal direction relative to the neck section 60.

Figure 6:
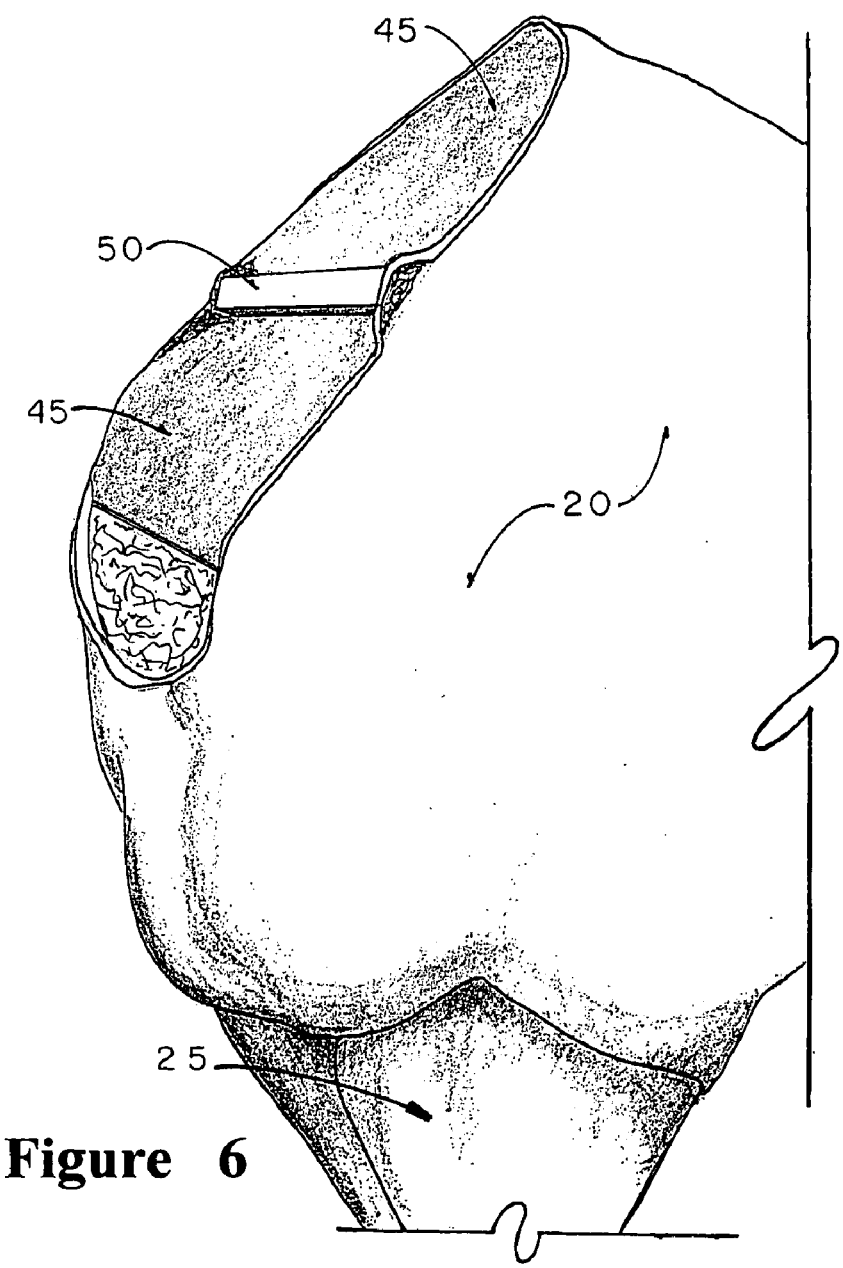
FIG. 6 is a perspective view of the body section's neck opening with internal brace member there across of the life sized, model horse assembly of the present invention.
Figure 7:
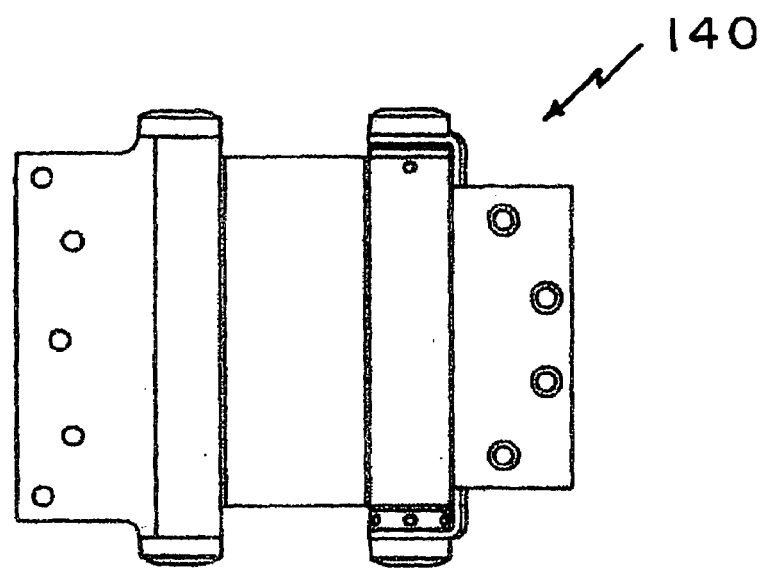
FIG. 7 is a plan view of an example of the double acting spring hinge member used within the life sized, model horse assembly of the present invention.
Figure 8:
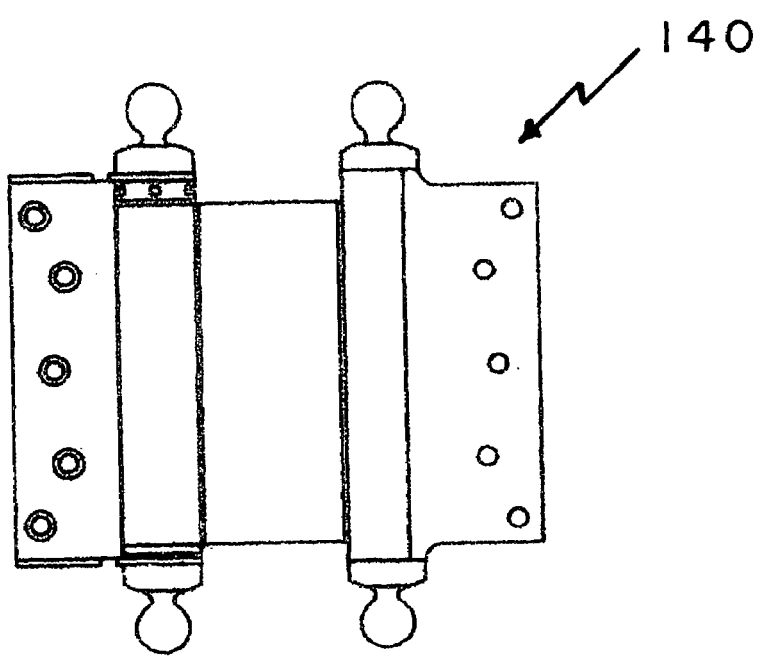
FIG. 8 is a plan view of another example of the double acting spring hinge member used within the life sized, model horse assembly of the present invention.

Referring now to FIG. 6, the body section's neck opening 45, with the internal brace member 50 there across, is in a horizontal orientation. The internal brace member 80 of the neck section's first open end 70 is also in a horizontal orientation. The first hinge mechanism 65 is secured between the horizontal, internal brace member 50 of the body section's neck opening 45 and the horizontal, internal brace member 70 adjacent the neck section's first open end 70. The embodiment of the first hinge mechanism 65 of the present invention also includes a pair of double acting spring hinge members 140, used to provide up and down movement of the neck section 60, relative to the body section 20. The double acting spring hinge members 140 are available commercially from a variety of sources, including Bommer Industries, Inc., of Landrum, S.C. Each double acting spring hinge member 140 is secured to both the horizontally oriented internal brace member 50 of the body section 20 and to the horizontally oriented internal brace member 80 of the neck section 60, adjacent the body section 20. The first hinge mechanism 65 operates as illustrated for the second hinge mechanism 95, illustrated in FIGS. 4–5.

In a further embodiment of the invention, a first, flexible covering member 145 is secured between the body section's neck opening 45 and the neck section's first open end 70. The first, flexible covering member 145 encircles both openings 45, 70 and protects the first hinge mechanism 65 secured between the body section 20 and neck section 60. Similarly, a second, flexible covering member 150 is secured between the head section's neck opening 105 and the neck section's second open end 75. The second, flexible covering member encircles both openings 75, 105 and protects the second hinge mechanism 95, secured between the head section 90 and the neck section 60.

The head section 90 of the model horse assembly 10 is fitted with an integral D-ring snaffle bit 175 at the normal location for a real horse. The bridle (not shown) and reins (not shown) are attached to a snaffle bit 175, for use by the rider, in causing movement of the head section 90 and neck section 60 by applying pressure thereto. In addition, the body section 20 contains a pair of D-rings 180, one D-ring 180 on each side thereof, for use in securing a saddle (not shown) to the body section 20 in the normal manner for a real horse.

The life sized, model horse assembly 10 of the present invention provides numerous advantages to the novice rider, the instructor, and the riding facility providing such training. The advantages include, reducing first-time rider fears, promoting safety, teaching the fundamentals, students demonstrating their comprehension, and protecting your horse from harsh hands.

Instructors receive the benefits of providing a safer method for demonstrating the following: the parts of a horse, the zones of a horse, the eyesight of a horse, the sensitivity of a horse, safely approaching and encountering a horse, saddling and cinching, bridling and bit functions, mounting and dismounting, body position and weight shifting, leg aids and the use of the hands. The level of student comprehension is more easily determined, with less apprehension about safety.

Students receive the benefits of eliminating height intimidation, soothing jitters and nerves, building confidence, learning fundamentals, transition to a real horse is less intimidating for both the rider and horse, and proper riding posture can be demonstrated.

Additional benefits include training for all students, a training equipment aid for staff, the fitting of tack or sizing a new saddle, sizing and fitting riding apparel, and identifying the parts of a horse.

Benefits to a facility using the life sized, model horse assembly 10 of the present invention include promotion of safety and reduction of risk, providing a certain amount of protection to the horses from the inexperienced riders and their harsh set of hands, a tool for the volunteers and staff to learn techniques and develop the skills needed for transferring students, with various abilities, on and off horses. The life sized, model horse assembly 10 can be used for promotional events, parades, and other exhibitions, as well as a marketing tool for other products and demonstrations.

While the invention has been particularly shown and described with reference to preferred embodiments thereof, it will be understood by those skilled in the art that various changes in form and details may be made therein without departing from the spirit and scope of the invention.

I claim:

1. A life sized model horse assembly with moveable head and neck sections comprising:
    a hollow body section with four upstanding leg portions attached thereto and a neck opening with internal brace member there across;
    a hollow neck section with first and second open ends and internal brace members adjacent each open end thereof,
    a hollow head section with a nose end and an open neck end having internal brace member adjacent thereto;
    a first hinge mechanism secured between the internal brace member of the body section's neck opening and the internal brace member adjacent the neck section's first open end, the first hinge mechanism connecting the neck section to the body section and providing vertical movement of the neck section relative to the body section;
    a second hinge mechanism secured between the internal brace member of the head section's open neck end and the internal brace member adjacent the neck section's second open end, the second hinge mechanism connecting the head section to the neck section and providing horizontal movement of the head section relative to the neck section; and
    a linear counterweight mechanism secured at one end interior the hollow neck section and extending through the first open end of the hollow neck section and into the hollow body section through the neck opening therein, the counterweight mechanism counter balancing the neck section and attached head section, thereby maintaining the head section and neck section in a natural orientation relative to the body section of the model horse assembly.

2. The life sized model horse assembly with moveable head and neck sections of claim 1, wherein the first and second hinge mechanisms each include at least one double acting spring hinge member.

3. The life sized model horse assembly with moveable head and neck sections of claim 1, wherein the first and second hinge mechanisms each include a pair of double acting spring hinge members.

4. The life sized model horse assembly with moveable head and neck sections of claim 1, wherein the linear counterweight mechanism pivotally contacts the internal brace member of the body section's neck opening.

5. The life sized model horse assembly with moveable head and neck sections of claim 1, further including a planar platform member for attachment of each leg portion thereto at a leg portion end opposite the body section.

6. The life sized model horse assembly with moveable head and neck sections of claim 5, further including first and second linear stabilizer members secured at opposite ends of the planar platform member, the stabilizer members adapted for maintaining the planar platform member and attached model horse assembly in a constant orientation on a support surface.

7. The life sized model horse assembly with moveable head and neck sections of claim 1, further including a flexible covering secured between the body section's neck opening and the neck section's first open end, the flexible covering encircling both openings and protecting the first hinge mechanism secured between the body section and neck section.

8. The life sized model horse assembly with moveable head and neck sections of claim 1, further including a flexible covering secured between the head section's neck opening and the neck section's second open end, the flexible covering encircling both openings and protecting the second hinge mechanism secured between the head section and neck section.

9. The life sized model horse assembly with moveable head and neck sections of claim 1, wherein the hollow body section, hollow neck section and hollow head section are fabricated from fiberglass reinforced resin material.

10. A life sized model horse assembly with moveable head and neck sections comprising:
   a hollow body section with four upstanding leg portions attached thereto and a neck opening with internal brace member there across;
   a hollow neck section with first and second open ends and internal brace members adjacent each open end thereof;
   a hollow head section with a nose end and an open neck end having internal brace member adjacent thereto;
   a first double acting spring hinge mechanism secured between the internal brace member of the body section's neck opening and the internal brace member adjacent the neck section's first open end, the first double acting spring hinge mechanism connecting the neck section to the body section and providing vertical movement of the neck section relative to the body section;
   a second double acting spring hinge mechanism secured between the internal brace member of the head section's open neck end and the internal brace member adjacent the neck section's second open end, the second double acting spring hinge mechanism connecting the head section to the neck section and providing horizontal movement of the head section relative to the neck section; and
   a linear counterweight mechanism secured at one end interior the hollow neck section and extending through the first open end of the hollow neck section and into the hollow body section through the neck opening therein, the counterweight mechanism counter balancing the neck section and attached head section, thereby maintaining the head section and neck section in a natural orientation relative to the body section of the model horse assembly.

11. The life sized model horse assembly with moveable head and neck sections of claim 10, wherein the first and second double acting spring hinge mechanisms each include a pair of double acting spring hinge members, with each hinge member secured directly between brace members of adjacent sections of the model horse assembly.

12. The life sized model horse assembly with moveable head and neck sections of claim 10, wherein the linear counterweight mechanism pivotally contacts the internal brace member of the body section's neck opening.

13. The life sized model horse assembly with moveable head and neck sections of claim 10, further including a planar platform member for attachment of each leg portion thereto at a leg portion end opposite the body section.

14. The life sized model horse assembly with moveable head and neck sections of claim 13, further including first and second linear stabilizer members secured at opposite ends of the planar platform member, the stabilizer members adapted for maintaining the planar platform member and attached model horse assembly in a constant orientation on a support surface.

15. The life sized model horse assembly with moveable head and neck sections of claim 10, further including a flexible covering secured between the body section's neck opening and the neck section's first open end, the flexible covering encircling both openings and protecting the first double acting spring hinge mechanism secured between the body section and neck section.

16. The life sized model horse assembly with moveable head and neck sections of claim 10, further including a flexible covering secured between the head section's neck opening and the neck section's second open end, the flexible covering encircling both openings and protecting the second double acting spring hinge mechanism secured between the head section and neck section.

17. The life sized model horse assembly with moveable head and neck sections of claim 10, wherein the hollow body section, hollow neck section and hollow head section are fabricated from fiberglass reinforced resin material.

18. A life sized model horse assembly with moveable head and neck sections comprising:
   a hollow body section with four upstanding leg portions attached thereto and a neck opening with internal brace member there across;
   a hollow neck section with first and second open ends and internal brace members adjacent each open end thereof;
   a hollow head section with a nose end and an open neck end having internal brace member adjacent thereto;
   a first pair of double acting spring hinge members, each hinge secured directly between the internal brace member of the body section's neck opening and the internal brace member adjacent the neck section's first open end, the first pair of double acting spring hinge members connecting the neck section to the body section and providing vertical movement of the neck section relative to the body section;
   a flexible covering secured between the body section's neck opening and the neck section's first open end, the flexible covering encircling both openings and protecting the first pair of double acting spring hinge members secured between the body section and neck section;
   a second pair of double acting spring hinge members, each hinge secured directly between the internal brace member of the head section's open neck end and the internal brace member adjacent the neck section's second open end, the second pair of double acting spring hinge members connecting the head section to the neck section and providing horizontal movement of the head section relative to the neck section;
   a flexible covering secured between the head section's neck opening and the neck section's second open end, the flexible covering encircling both openings and protecting the second pair of double acting spring hinge members secured between the head section and neck section; and a linear counterweight mechanism secured at one end interior the hollow neck section and extending through the first open end of the hollow neck section and into the hollow body section through the neck opening therein, the counterweight mechanism counter balancing the neck section and attached head section, thereby maintaining the head section and neck section in a natural orientation relative to the body section of the model horse assembly.

19. The life sized model horse assembly with moveable head and neck sections of claim 18, further including a planar platform member for attachment of each leg portion thereto at a leg portion end opposite the body section.

20. The life sized model horse assembly with moveable head and neck sections of claim 19, further including first and second linear stabilizer members secured at opposite ends of the planar platform member, the stabilizer members adapted for maintaining the planar platform member and attached model horse assembly in a constant orientation on a support surface.

* * * * *